United States Patent [19]
Powers et al.

[11] 3,869,823
[45] Mar. 11, 1975

[54] BIRD DECOY

[76] Inventors: Donald Powers; Delmar Washechek, both of P.O. Box 2, Kimball, S. Dak. 57355

[22] Filed: Aug. 16, 1972

[21] Appl. No.: 281,118

[52] U.S. Cl. ................................................... 43/3
[51] Int. Cl. .......................................... A01m 31/06
[58] Field of Search .......................................... 43/3

[56] References Cited
UNITED STATES PATENTS

| | | | |
|---|---|---|---|
| 673,846 | 5/1901 | Ravert | 43/3 |
| 883,161 | 3/1908 | Rosentreter | 43/3 |
| 977,787 | 12/1910 | Davis | 43/3 |
| 2,536,338 | 1/1951 | Withey et al. | 43/3 |
| 2,816,384 | 12/1957 | Rexius | 43/3 |
| 3,435,550 | 4/1969 | Carlson | 43/3 |

*Primary Examiner*—Robert Peshock
*Assistant Examiner*—J. Q. Lever
*Attorney, Agent, or Firm*—Brumbaugh, Graves, Donohue & Raymond

[57] ABSTRACT

A bird decoy which is suitable for use in decoying ducks and geese is disclosed and has a body with a head connected thereto. The head is connected by a swivel mount which allows it to be rotated against the body when the decoy is not in use. Wings are hingedly attached to the body and contain a second hinge mounting at a point intermediate the tip of the wing and the point of connection of the wing to the body. They can be folded into a compact configuration against the body of the decoy when it is being stored or transported. Legs can also be provided, and these are also hinged to the body. The decoy can be set up on a stand, and the wings and feet can be placed in their spread position to more accurately depict the particular bird the decoy is intended to represent.

3 Claims, 3 Drawing Figures

PATENTED MAR 11 1975 3,869,823

BIRD DECOY

BACKGROUND OF THE INVENTION

1. Field of the Invention

The present invention is a bird decoy which can be used to decoy geese, ducks and other aquatic waterfowl.

2. Scope of Prior Art

Bird decoys which have been used to lure ducks and geese to a position proximate to hunters are well known in the art. These decoys generally comprise only a body and head. The body has either painted thereon or engraved therein features which are intended to represent wings. Prior art decoys do not have components such as wings and feet which could be spread outwardly from the body to represent a bird in flight or in the process of taking off or landing. The known decoys have become less and less effective for luring and decoying waterfowl. The decoys either sit motionless in the water or are powered to move slowly in circles.

SUMMARY OF THE INVENTION

The bird decoy of the present invention comprises a body and head which are generally similar to the body and head found in prior art bird decoys. However, the head portion in the present decoy is hinged on a swivel mount and can be rotated back against the body so that the decoy is in a more compact configuration for transportation or storage. The present invention also differs from prior art decoys since it has wings which are hingedly connected to the body of the decoy. These wings can also have a hinged mounting at a point intermediate their point of connection with the body and their tips to insure that they are in a compact configuration when fully folded. The decoy of the present invention also comprises feet which are hinged to the body and which can be deployed to give a more accurate representation of the bird and one in flight. A metal support inside the body of the decoy contains a threaded hole which can be affixed to a threaded end of a support stand if the hunter desires to have the decoy in a flight configuration with the wings extended.

BRIEF DESCRIPTION OF THE DRAWINGS

The invention described herein is further understood by reference to the drawings which also form a portion of the specification and which are appended herewith, wherein.

DESCRIPTION OF A PREFERRED EMBODIMENT

Figure 1:
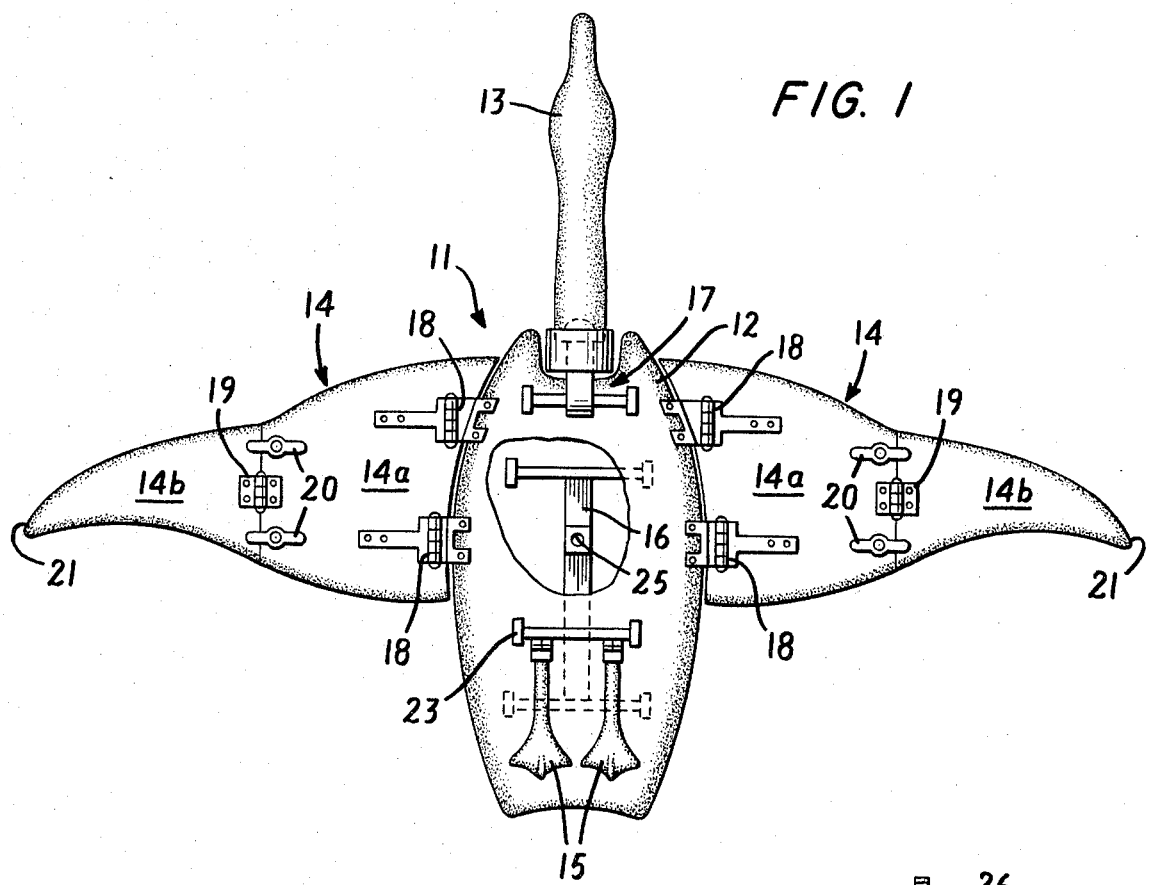
FIG. 1 is a plan view, partially broken away, showing the decoy of the present invention with its wings extended in a flight configuration.
Figure 2:
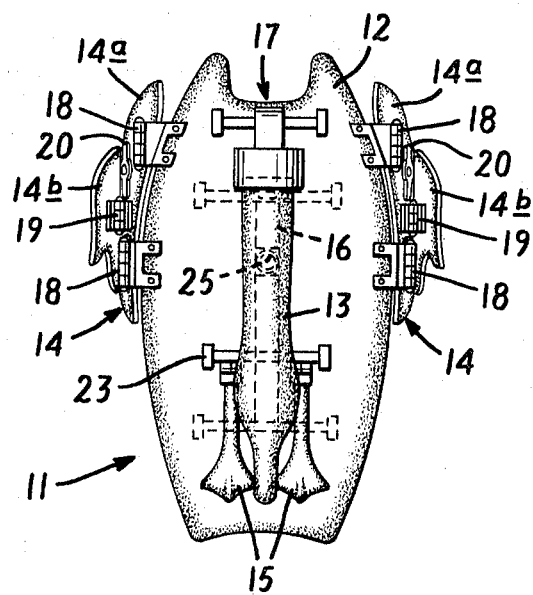
FIG. 2 is a view similar to that in FIG. 1 showing the decoy of the present invention in its fully folded configuration.

As shown in the Figures, the decoy 11 of the present invention comprises a body 12, a head 13, wings 14 and feet 15. The body 12 can be formed of plastic, wood, compressed paper or the like and has a stand support 16 located inside it. The head 13 is hingedly fixed on a swivel mount 17 at one end of the body 12 and is adapted to be pivoted so that it either lies against the body 12 or in a slot formed therein. Such a configuration is more compact and is more easily transported. In addition, wings 14 are provided on either side of the body 12 and and are hingedly connected to the body by the friction hinges 18 to allow for their deployment in a configuration indicating flight. In a preferred embodiment each of the wings comprise an inner portion 14a which connects with body 12 and an outer portion 14b which is hinged by hinge 19 to the inner portion 14a. Turn locks 20 hold the wing portions 14a and 14b in a straight line. This hinged connection between wing portions 14a and 14b at a portion of wing 14 lying intermediate its tip 21 and the point of connection of the wing portion 14a with the body 12 gives a wing structure which is easily folded into a very compact configuration.

The feet 15 of the decoy also are rotatably mounted on friction hinges 23 on the body 12.

Figure 3:
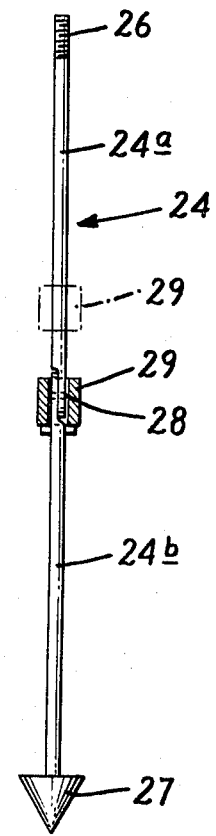
FIG. 3 is a perspective view showing a support stand which can be used in conjunction with the decoy of the present invention.

In order to give the decoy body 12 the necessary degree of strength and to provide for a mounting point for a stand 24 for the decoy, the body 12 has contained therein a stand support 16 which has a threaded socket 25 which is adapted to receive the threaded end at the upper portion 24a of the stand 24. The stand 24 has a suitable mounting means or base 27 on its lower portion 28. Any mounting means or base can be used, but in the preferred embodiment pictured in FIG. 3 the mounting means 27 is merely a tapered end which can be driven into the mud which normally surrounds the aquatic flatlands where the decoy would be most commonly used. The two portions 24a and 24b of the stand 24 are jointed together at a hinge point 28 so that they can be folded onto one another to form a more compact member. A sliding lock 29 on one of the portions 24a of the stand 24 can hold the stand 24 in its fully unfolded position when the lock 29 is slid over the hinge point 28.

The present invention is more lifelike and therefore more effective than bird decoys presently used in the art. Merely by spreading the wings and deploying the feet of the decoy, a hunter can provide a decoy which gives a more accurate representation of a particular type of bird. The use of the stand allows the hunter to deploy the bird at some distance above the ground to convey a flight configuration for the decoy merely by appropriate placement of the feet, wings and appropriate tilt of the body of the decoy.

Persons in the art will become aware of a number of modifications that can be made to the invention described herein without departing from the spirit and scope of the invention. Hence the foregoing is merely intended to be illustrative of a number of preferred embodiments of the invention. The scope of protection is set forth in the appended claims.

We claim:

1. A bird decoy comprising a body, a head rotatably connected to the body, two wings connected to the body by hinges, at least one of the wings is further hinged at a point between its respective point of connection with the body and its respective tip, two feet rotatably connected to the body, whereby the head, wings and feet can be positioned so that the decoy resembles a bird in flight and the head, wings and feet can also be folded against the body for storage and transportation, a stand, and means located on a support frame within the body which are adapted to receive the end of the stand to allow for display of the decoy in a flight configuration at some distance above the ground.

2. A decoy as claimed in claim 1 wherein the decoy is formed from a material selected from the group consisting of plastic and compressed paper.

3. A decoy as claimed in claim 1 which further comprises a turnlock adjacent the hinge means on the wings lying between the tip of the wing and the point of connection of the wing with the body.

* * * * *